(12) United States Patent
Ito et al.

(10) Patent No.: US 6,637,465 B2
(45) Date of Patent: Oct. 28, 2003

(54) FUEL HOSE

(75) Inventors: Hiroaki Ito, Kasugai (JP); Hirokazu Kitamura, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/350,269

(22) Filed: Jan. 24, 2003

(65) Prior Publication Data

US 2003/0136457 A1 Jul. 24, 2003

(30) Foreign Application Priority Data

Jan. 24, 2002 (JP) ........................................ 2002-016176
Sep. 24, 2002 (JP) ........................................ 2002-277443

(51) Int. Cl.[7] ............................................... F16L 11/04
(52) U.S. Cl. ................. 138/137; 138/140; 138/DIG. 7; 428/36.91
(58) Field of Search ................................ 138/137, 140, 138/141, DIG. 1, DIG. 7; 428/36.91, 34.7, 36.4

(56) References Cited

U.S. PATENT DOCUMENTS

| 5,380,571 A | * | 1/1995 | Ozawa et al. | 428/36.9 |
|---|---|---|---|---|
| 5,468,530 A | * | 11/1995 | Gotz et al. | 428/36.4 |
| 5,476,080 A | * | 12/1995 | Brunnhofer | 123/468 |
| 5,476,120 A | * | 12/1995 | Brunnhofer | 138/137 |
| 5,671,780 A | * | 9/1997 | Kertesz | 138/127 |
| 5,733,619 A | * | 3/1998 | Patel et al. | 428/36.91 |
| 5,792,532 A | * | 8/1998 | Pfleger | 428/36.9 |
| 5,910,540 A | * | 6/1999 | Takahashi | 525/92 B |
| 6,089,278 A | * | 7/2000 | Nishino et al. | 138/137 |
| 6,090,459 A | * | 7/2000 | Jadamus et al. | 428/36.4 |
| 6,355,321 B1 | * | 3/2002 | Nishino et al. | 138/137 X |

FOREIGN PATENT DOCUMENTS

| JP | 2002-213655 | 7/2002 |
|---|---|---|
| JP | 2002-267054 | 9/2002 |

* cited by examiner

Primary Examiner—Patrick Brinson
(74) Attorney, Agent, or Firm—Armstrong, Westerman & Hattori, LLP

(57) ABSTRACT

A fuel hose which satisfies low-permeability requirements in conformity with stringent regulations against vapor emission of fuel gases, is halogen-free and has excellent hydrolysis resistance, inter-layer adhesiveness and low-temperature flexibility. The fuel hose comprises: an innermost layer (1) comprising a thermoplastic polyester elastomer and having a flexural modulus in a predetermined range; an intermediate layer (2) comprising a polyester resin and provided around the innermost layer (1); and an outermost layer (3) comprising a thermoplastic polybutylene terephthalate elastomer and provided around the intermediate layer (2).

3 Claims, 1 Drawing Sheet

Figure
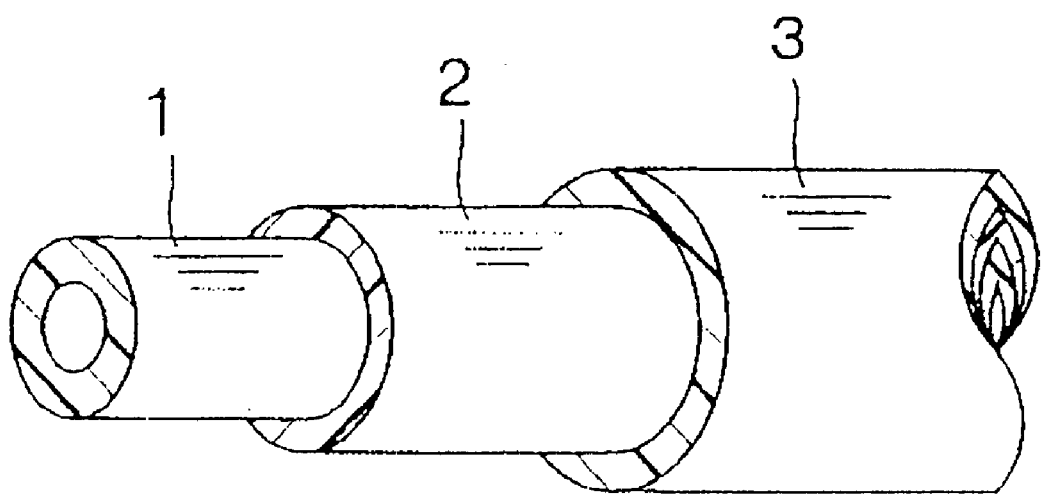

FUEL HOSE

BACKGROUND OF THE INVENTION

1. Field of the Invention

The present invention relates to an automotive fuel hose used for the transportation of a fuel such as gasoline, alcohol-containing gasoline (gasohol), alcohol, hydrogen, light oil, dimethyl ether, liquefied petroleum gas (LPG) or compressed natural gas (CNG).

2. Description of the Art

To cope with more stringent regulations against vapor emission of automotive fuel gases in recent years, there has been a demand for low-permeability fuel hoses. As a consequence, there have been proposed various types of fuel hoses employing a polyester resin which is advantageous since it has a high barrier property against a gasohol. However, a polyester resin is disadvantageously poor in hydrolysis resistance. To solve this problem, it is proposed that an innermost layer of a polyamide resin or a fluororesin which have an excellent hydrolysis resistance is formed on the interior of the polyester resin hose to make the hose less permeable and more resistant to hydrolysis (see, for example, Japanese Unexamined Patent Publications No. HEI7-96564 (1995), No. 2000-71407 and No. HEI6-23930 (1994)).

However, a polyester resin is difficult to adhere to other types of materials such as a polyamide and a fluororesin. Therefore, the polyester resin layer and the polyamide resin layer (or the fluororesin layer) are typically laminated by providing a special adhesive layer therebetween. In some cases, a surface treatment such as a plasma treatment or a sputtering treatment is performed on-mating surfaces of the layers, correspondingly complicating the production process.

Further, a fuel hose is required to have flexibility (or impact resistance) at low temperatures such as about −40° C.

In addition, with recent growing awareness of environmental issues, the fuel hose is required to be composed of halogen-free materials so as not to generate hazardous substances such as dioxins during combustion thereof.

In view of the foregoing, it is an object of the present invention to provide a fuel hose which satisfies low-permeability requirements in conformity with stringent regulations against vapor emission of fuel gases, and is halogen-free and further is excellent in hydrolysis resistance, inter-layer adhesiveness and low-temperature flexibility.

SUMMARY OF THE INVENTION

In accordance with the present invention to achieve the aforesaid object, there is provided a fuel hose, which comprises an innermost layer comprising a thermoplastic polyester elastomer having a flexural modulus of 400 to 2000 MPa, an intermediate layer comprising a polyester resin and provided around the inner layer, and an outermost layer comprising a thermoplastic polybutylene terephthalate elastomer and provided around the intermediate layer.

The inventors of the present invention conducted intensive studies, mainly on materials for respective layers of a fuel hose of a laminate structure, to solve the aforesaid problems. As a result, the inventors found that the innermost layer of the thermoplastic polyester elastomer, the intermediate layer of the polyester resin and the outermost layer of the thermoplastic polybutylene terephthalate elastomer, can be laminated with a sufficient inter-layer adhesive strength without the use of an adhesive because the fuel hose is entirely produced from the polyester materials. With this structure, the hard polyester resin layer (intermediate layer) is held between flexible elastomer layers (between the innermost layer having a predetermined flexural modulus and the outermost layer). Therefore, the fuel hose has excellent flexibility, and less permeability to an automotive fuel and the like. In addition, the poorer hydrolysis resistance of the polyester resin is compensated by the innermost and outermost elastomer layers. Since the outermost layer is composed of the thermoplastic polybutylene terephthalate elastomer according to the present invention, the fuel hose has excellent flexibility, even at low temperatures. Thus, the present invention has been attained.

BRIEF DESCRIPTION OF THE DRAWING

The sole Figure is a diagram illustrating the construction of an exemplary fuel hose according to the present invention.

DESCRIPTION OF THE PREFERRED EMBODIMENTS

The present invention will hereinafter be described in detail by way of embodiments thereof.

As shown in the Figure a fuel hose according to the present invention includes an innermost layer 1 composed of a thermoplastic polyester elastomer and having a flexural modulus falling within a predetermined range, an intermediate layer 2 composed of a polyester resin and provided on the outer periphery of the innermost layer 1, and an outermost layer 3 composed of a thermoplastic polybutylene terephthalate elastomer and provided on the outer periphery of the intermediate layer 2.

The thermoplastic polyester elastomer as a material for the innermost layer 1 is not particularly limited, but examples thereof include thermoplastic polyester elastomers containing a polyester resin such as polybutylene terephthalate (PBT) or polybutylene naphthalate (PBN) as a hard segment and a polyether such as polytetramethylene glycol as a soft segment. These thermoplastic polyester elastomers may be used either alone or in combination. Among these thermoplastic polyester elastomers, a thermoplastic polybutylene terephthalate (PBT) containing elastomer and a thermoplastic polybutylene naphthalate (PBN) containing elastomer are preferred, because they have excellent sour gasoline resistance (resistance to a sour gasoline generated through oxidation of a gasoline) and craze resistance. Alternatively, a blend of polybutylene terephthalate and a polyolefin elastomer such as a thermoplastic polyester elastomer (7) described later in Examples of the invention, may be employed as the material for the innermost layer 1. This material also is preferred because it has a moderately high hardness as well as an excellent impact resistance at low temperatures.

The innermost layer material preferably further contains an electrically conductive material such as carbon black, carbon nano tube, metal powder or metal oxide powder. The purpose of material is to release static electricity generated by a fuel pump out of the hose for preventing accidents such as inflammation to a fuel (gasoline) which may otherwise occur due to the static electricity. When electrical conductivity is imparted to the innermost layer, the innermost layer preferably has a surface electrical resistance of not greater than $10^8 \Omega$, particularly preferably 10 to $10^7 \Omega$. The proportion of the electrically conductive material is preferably selected to have the surface electrical resistance of the innermost layer within the aforesaid range.

The flexural modulus of the thermoplastic polyester elastomer as the material for the innermost layer 1 is 400 MPa to 2000 MPa, preferably 450 MPa to 1950 MPa. If the flexural modulus of the thermoplastic polyester elastomer is smaller than 400 MPa, the innermost layer tends to be swelled to a greater extent by gasoline and have an inferior sour gasoline resistance. If the flexural modulus is greater than 2000 MPa, the low-temperature resistance and the craze resistance tend to be deteriorated.

The polyester resin used as a material for the intermediate layer 2 provided on the outer periphery of the innermost layer 1 is not particularly limited, but examples thereof include PBT, PBN, polyethylene naphthalate (PEN) and polyethylene terephthalate (PET) These polyester resins may be used either alone or in combination. Among these polyester resins, PBN is particularly preferred because it is less permeable to the gasoline and the like.

As described above, a thermoplastic PBT elastomer is employed as a material for the outermost layer 3 provided on the outer periphery of the intermediate layer 2. A fuel hose having the outermost layer 3 composed of the thermoplastic PBT elastomer has excellent low-temperature flexibility (impact resistance) as compared with the outermost layer 3 being composed of a thermoplastic PBN elastomer. For example, the thermoplastic PBT elastomer contains PBT as a hard segment, and a polyether such as polytetramethylene glycol, a polyester such as polybutylene adipate or a copolymer of the polyether and the polyester as a soft segment.

The thermoplastic PBT elastomer as the material for the outermost layer 3 preferably has a flexural modulus of 100 MPa to 1000 MPa, particularly preferably 150 MPa to 800 MPa. If the flexural modulus of the thermoplastic PBT elastomer is smaller than 100 MPa, the pressure resistance of the entire hose tends to be disadvantageously reduced. If the flexural modulus is greater than 1000 MPa, the flexibility and low-temperature resistance of the hose may be deteriorated.

The inventive fuel hose shown in the Figure is produced, for example, in the following manner.

The innermost layer material, the intermediate layer material and the outermost layer material, which have been preliminarily mixed by means of a kneader, respectively, if necessary, are prepared and co-extruded by means of an extruder for simultaneous formation of the three layers. Thus, the fuel hose of the three-layer structure is produced (see the FIG.). By thus simultaneously forming the three layers through co-extrusion, the three layers can be laminated with a sufficient inter-layer adhesive strength without the use of an adhesive.

The hose may be formed into a straight shape by a vacuum sizing method, or into a bellows shape by means of a corrugator.

The production methods for the fuel hose shown in the Figure are not limited to the aforesaid co-extrusion method for lamination of the respective layers. For example, the innermost layer material is mixed by means of a kneader and extruded by means of an extruder for formation of a single layer hose structure, and then the intermediate layer material and the outermost layer material are successively extruded around the hose structure for the formation of the intended fuel hose having the three layer structure. Although the respective layers are generally bonded together without the use of an adhesive, an adhesive may be used as a bonding aid. The fuel hose may be of a multi-layer structure having four or more layers, which include one or more polyester resin layers interposed between the innermost layer 1 and the intermediate layer 2 and/or between the intermediate layer 2 and the outermost layer 3.

The inventive fuel hose thus produced preferably has an inner diameter of 4 mm to 40 mm, particularly preferably 4 mm to 30 mm, and an outer diameter of 6 mm to 44 mm, particularly preferably 8 mm to 32 mm. The innermost layer 1 preferably has a thickness of 0.01 mm to 0.5 mm, particularly preferably 0.1 mm to 0.4 mm. The intermediate layer 2 preferably has a thickness of 0.01 mm to 0.5 mm, particularly preferably 0.05 mm to 0.4 mm. The outermost layer 3 preferably has a thickness of 0.1 mm to 3 mm, particularly preferably 0.3 mm to 1 mm.

The inventive fuel hose is advantageously employed as an automotive fuel hose, but is not limited thereto. For example, the inventive fuel hose may be employed as a fuel hose for a tractor or a farm tractor.

Next, a description will be given to Examples and Comparative Examples.

Prior to the description of the Examples and the Comparative Examples, materials herein employed will be explained.

(1) Thermoplastic Polyester Elastomer—TPEE (1)

A thermoplastic PBT elastomer (HYTREL 8238 available from E. I. DuPont de Nemours & Company of Wilmington, USA) having a flexural modulus of 1110 MPa.

(2) Thermoplastic Polyester Elastomer—TPEE (2)

A thermoplastic PBN elastomer (PERPRENE EN5030 available from Toyobo Co., Ltd. of Osaka, Japan) having a flexural modulus of 470 MPa.

(3) Thermoplastic Polyester Elastomer—TPEE (3)

A thermoplastic PBT elastomer (HYTREL 5577R07 available from DuPont-Toray Co., Ltd. of Tokyo, Japan) having a flexural modulus of 200 MPa.

(4) Thermoplastic Polyester Elastomer—TPEE (4)

A thermoplastic PBT elastomer (HYTREL 7277R07 available from DuPont-Toray Co., Ltd. of Tokyo, Japan) having a flexural modulus of 570 MPa.

(5) Thermoplastic Polyester Elastomer—TPEE (5)

A thermoplastic PBT elastomer (HYTREL 6377R07 available from DuPont-Toray Co., Ltd. of Tokyo, Japan) having a flexural modulus of 370 MPa.

(6) Thermoplastic Polyester Elastomer—TPEE (6)

A thermoplastic PBN elastomer (PERPRENE EN16000 available from Toyobo Co., Ltd. of Osaka, Japan) having a flexural modulus of 1600 MPa.

(7) Thermoplastic Polyester Elastomer—TPEE (7)

A thermoplastic PBT elastomer (GLILPET B24HNZ available from EMS-CHEMIE AG of Domat, Switzerland) having a flexural modulus of 1900 MPa.

PBT

CELANEX 2001 (available from Polyplastics Co., Ltd. of Tokyo, Japan) having a flexural modulus of 2450 MPa.

PBN

TQB-TO (available from Teijin Chemicals, Ltd. of Tokyo, Japan) having a flexural modulus of 2190 MPa.

PEN

TEONEX TN8770 (available from Teijin Chemicals, Ltd. of Tokyo, Japan) having a flexural modulus of 2300 MPa.

EXAMPLE 1

TPEE (1) was prepared as an innermost layer material, and PBT was prepared as an intermediate layer material. TPEE (3) was prepared as an outermost layer material. These materials were co-extruded by an extruder for simultaneous formation of the respective layers. Thus, a fuel hose was produced, which had a three layer structure including a 200-μm thick innermost layer, a 200-μm thick intermediate layer and a 600-μm thick outermost layer, and had an inner diameter of 6 mm and an outer diameter of 8 mm.

EXAMPLES 2 TO 9 AND COMPARATIVE EXAMPLES 1 TO 5

Fuel hoses were produced in substantially the same manner as in Example 1, except that innermost layer materials, intermediate layer materials and outermost layer materials as shown in Tables 1 to 3 were employed and the respective layers had different thicknesses.

The fuel hoses of the Examples and the Comparative Examples thus produced were evaluated for characteristic properties thereof in the following manners. The results of the evaluations are shown in Tables 1 to 3.

Permeability to Gasoline

Opposite end portions of a 10 m long fuel hose were each expanded to an inner diameter of 10 mm by means of a cone-shaped jig. Then, two metal pipes each having an outer diameter of 8 mm with two bulged portions each having an outer diameter of 10 mm and with each one end thereof having a rounded outer periphery were respectively press-fitted into opposite end portions of the hose. A blind cap was threadingly attached to one of the metal pipes, and a metal valve was attached to the other metal pipe. Thereafter, a fuel (a mixture of a regular gasoline and 10 vol % ethanol) was supplied into the fuel hose through the metal valve, and the fuel hose was sealed. The fuel hose was allowed to stand at 40° C. in an oven for 3000 hours (the fuel was changed every week). Then, fuel permeation was measured for three days on the basis of a Diurnal Breathing Loss (DBL) pattern by the Sealed Housing for Evaporative Detection (SHED) method in accordance with California Air Resources Board (CARB). Then, fuel permeation per meter of the hose (mg/m) was determined on a day when the maximum permeation was detected. In Tables 1 to 3, a notation "<0.1" indicates that the measured fuel permeation was below the measurement limitation (0.1 mg/m) of the aforesaid measurement method.

Hydrolysis Resistance

After a fuel hose was allowed to stand at a temperature of 80° C. at a humidity of 95% for 1000 hours, the hose was bent by 180 degrees. The condition of the hose was visually observed for evaluating the hydrolysis resistance. In Tables 1 to 3, a symbol ○ indicates that the hose suffered from no abnormality. Where the hose suffered from an abnormality, the abnormality is noted in Tables 1 to 3.

Low-temperature Flexibility

Immediately after a fuel hose was refrigerated at −40° C. for four hours, the fuel hose was bent by 180 degrees. The condition of the hose was visually observed for evaluating the low-temperature flexibility. In Tables 1 to 3, a symbol ○ indicates that the hose suffered from no abnormality. Where the hose suffered from an abnormality, the abnormality is noted in Tables 1 to 3.

Sour Gasoline Resistance

A model of degraded gasoline was prepared by blending 5 wt % of lauroyl peroxide (LPO) in Fuel C (50% by volume of toluene+50% by volume of isoctane) Then, two metal pipes were respectively press-fitted into opposite end portions of a 10 m long fuel hose. After the model of degraded gasoline was circulated through the fuel hose at 60° C. at a pressure of 0.3 MPa for eight hours via a pressure regulator, the model of degraded gasoline was filled in the fuel hose for 16 hours. After this cycle was repeated ten times, a part of the fuel hose was sampled and bent by 180 degrees. The sampled part was cut into halves, and the inner surface thereof was visually observed for evaluating the sour gasoline resistance. In Tables 1 to 3, a symbol ○ indicates that the fuel hose did not suffer from any abnormalities such as cracks, and a symbol × indicates that the fuel hose suffered from cracks or fractures.

TABLE 1

| | Example | | | | |
|---|---|---|---|---|---|
| | 1 | 2 | 3 | 4 | 5 |
| Materials | | | | | |
| Innermost layer | TPEE(1) | TPEE(1) | TPEE(2) | TPEE(2) | TPEE(2) |
| Intermediate layer | PBT | PBN | PBT | PBN | PEN |
| Outermost layer | TPEE(3) | TPEE(3) | TPEE(3) | TPEE(3) | TPEE(3) |
| Thicknesses (μm) | | | | | |
| Innermost layer | 200 | 200 | 200 | 200 | 200 |
| Intermediate layer | 200 | 100 | 100 | 100 | 100 |
| Outermost layer | 600 | 700 | 700 | 700 | 700 |
| Permeability to gasoline (mg/m) | 2.8 | <0.1 | 5.0 | <0.1 | <0.1 |
| Hydrolysis resistance | ○ | ○ | ○ | ○ | ○ |
| Low-temperature flexibility | ○ | ○ | ○ | ○ | ○ |
| Sour gasoline resistance | ○ | ○ | ○ | ○ | ○ |

TABLE 2

| | Example | | | |
|---|---|---|---|---|
| | 6 | 7 | 8 | 9 |
| Materials | | | | |
| Innermost layer | TPEE(4) | TPEE(4) | TPEE(6) | TPEE(7) |
| Intermediate layer | PEN | PBT + PBN* | PBN | PBN |
| Outermost layer | TPEE(3) | TPEE(3) | TPEE(3) | TPEE(3) |
| Thicknesses (μm) | | | | |
| Innermost layer | 200 | 200 | 200 | 200 |
| Intermediate layer | 100 | 100 | 100 | 100 |
| Outermost layer | 700 | 700 | 700 | 700 |
| Permeability to gasoline (mg/m) | <0.1 | 0.1 | <0.1 | <0.1 |
| Hydrolysis resistance | ○ | ○ | ○ | ○ |
| Low-temperature flexibility | ○ | ○ | ○ | ○ |
| Sour gasoline resistance | ○ | ○ | ○ | ○ |

*PBT and PBN were dry-blended in a ratio of 50 wt %:50 wt %.

TABLE 3

| | Comparative Example | | | | |
|---|---|---|---|---|---|
| | 1 | 2 | 3 | 4 | 5 |
| Materials | | | | | |
| Innermost layer | — | — | TPEE(2) | TPEE(5) | TPEE(3) |
| Intermediate layer | PBT | PBN | PBN | PBN | PBN |
| Outermost layer | TPEE(3) | TPEE(3) | TPEE(2) | TPEE(3) | TPEE(3) |
| Thicknesses ($\mu$m) | | | | | |
| Innermost layer | — | — | 200 | 200 | 200 |
| Intermediate layer | 200 | 200 | 100 | 100 | 100 |
| Outermost layer | 800 | 800 | 700 | 700 | 700 |
| Permeability to gasoline (mg/m) | 9.0 | 335 | <0.1 | <0.1 | <0.1 |
| Hydrolysis resistance | (A) | ○ | ○ | ○ | ○ |
| Low-temperature flexibility | ○ | (B) | (A) | ○ | ○ |
| Sour gasoline resistance | ○ | ○ | ○ | X | X |

(A): Hose was broken.
(B): Inner surface of hose was cracked.

As can be appreciated from the aforesaid results, the fuel hoses of the Examples had excellent permeation resistance, hydrolysis resistance, low-temperature flexibility and:.sour gasoline resistance. Among the fuel hoses of the Examples, the fuel hose of Example 9 had particularly excellent low-temperature impact resistance although its innermost layer material had a moderately high hardness. On the other hand, the fuel hose of Comparative Example 1 having the PBT innermost layer had an inferior hydrolysis resistance and a slightly poorer permeation resistance. The fuel hose of Comparative Example 2 having the hard PBN innermost layer was inferior in permeation resistance. This is because the innermost layer was cracked over time due to strains occurring in the expanded end portions of the fuel hose when the metal pipes were press-fitted therein, so that the gasoline was more liable to leak from the cracked-portions. In addition, the fuel hose had inferior low-temperature flexibility, because the PBN innermost layer was exposed to the interior of the hose. The fuel hose of Comparative Example 3 having the outermost layer of the thermoplastic PBN elastomer had inferior low-temperature flexibility compared to the fuel hoses of the Examples each having the outermost layer of the thermoplastic PBT elastomer. The fuel hoses of Comparative Examples 4 and 5 had inferior sour gasoline resistance, because the innermost layers thereof each had a flexural modulus smaller than the predetermined range.

As described above, a fuel hose according to the present invention comprises an innermost layer comprising a thermoplastic polyester elastomer having a predetermined flexural modulus, an intermediate layer comprising a polyester resin and provided around the innermost layer, and an outermost layer comprising a thermoplastic polybutylene terephthalate elastomer and provided around the intermediate layer. Therefore, the respective layers of the fuel hose are laminated with a sufficient inter-level adhesive strength, even without the use of an adhesive, so that the production process is correspondingly simplified thereby improving productivity. With this laminate structure, the fuel hose has excellent fuel gas permeation resistance, sour gasoline resistance, hydrolysis resistance and flexibility. Since the outermost layer is composed of the thermoplastic polybutylene terephthalate elastomer, the fuel hose has excellent flexibility, even at low temperatures. Further, the fuel hose satisfies a halogen-free requirement, because the materials for the respective layers of the fuel hose are free from halogen-containing compounds.

Particularly when the innermost layer of the fuel hose is composed of the thermoplastic polybutylene terephthalate elastomer or the thermoplastic polybutylene naphthalate elastomer, the sour gasoline resistance and the craze resistance are further improved.

When the innermost layer of the fuel hose is composed of a blend of the polybutylene terephthalate and the polyolefin elastomer, the fuel hose has excellent low-temperature impact resistance while having a moderately high hardness.

What is claimed is:

1. A fuel hose comprising: an innermost layer comprising a thermoplastic polyester elastomer having a flexural modulus of 400 MPa to 2000 MPa; an intermediate layer comprising a polyester resin and provided around the innermost layer; and an outermost layer comprising a thermoplastic polybutylene terephthalate elastomer and provided around the intermediate layer.

2. A fuel hose as set forth in claim 1, wherein the innermost layer comprises at least one of a thermoplastic polybutylene terephthalate elastomer and a thermoplastic polybutylene naphthalate elastomer.

3. A fuel hose as set forth in claim 1, wherein the innermost layer comprises a blend of a polybutylene terephthalate and a polyolefin elastomer.

* * * * *